United States Patent Office 3,541,033
Patented Nov. 17, 1970

3,541,033
CRYSTALLINE ETHYLENE, ALPHA-BETA OLE-FINICALLY UNSATURATED CARBOXYLIC ACID COPOLYMER LATEX PAPER COATING COMPOSITIONS
George W. Buttrick and James F. Hoover, Charleston, W. Va., assignors to Union Carbide Corporation, a corporation of New York
No Drawing. Filed Mar. 25, 1968, Ser. No. 715,519
Int. Cl. C08h 7/00; D21h 1/28
U.S. Cl. 260—8
32 Claims

ABSTRACT OF THE DISCLOSURE

Crystalline ethylene, alpha-beta olefinically unsaturated carboxylic acid copolymers optionally copolymerized with vinylidene compounds having surprisingly been found to exhibit excellent pigment binding properties especially in paper coating compositions employing large percentages of mineral pigments such as clay. The crystallinity and high filming temperatures of the latexes used would indicate that these compositions would be unsuitable in pigment binding applications, especially where high pigment concentrations are employed such as in the paper coating art.

Examples of copolymer latexes suitable in this regard comprises ethylene acrylic acid copolymers, ethylene, acrylic acid, terpolymers with a 1 to about 12 carbon atom alkanol ester of acrylic acid and methacrylic acid and similar vinylidene compounds.

---

The present invention relates to a novel coating composition comprising a crystalline copolymer latex of ethylene and an alpha-beta olefinically unsaturated organic carboxylic acid optionally having a vinylidene compound copolymerized therewith. More particularly, the present invention relates to the foregoing composition in which large quantities of a mineral pigment such as clay are employed. This invention also relates to an article of manufacture comprising paper coated with these compositions.

Synthetic polymer latexes are known vehicles or pigment binders for paper coatings or exterior paints. Generally, exterior paints contain a relatively low order of pigment loading whereas paper coatings contain considerably greater amounts of pigments. Typical exterior latex paints contain anywhere from 30 to 40 percent pigment volume concentration (PVC) whereas paper coatings range from about 60–85 percent PVC. This amounts to about 5–25% of latex based on dry pigment for paper as contrasted to about 50–70% by weight of latex for paint. Large quantities of mineral pigments such as clay are employed in paper coatings because of economic considerations as well as the printing qualities and resultant appearance of the paper. The principle function of clay in a paper coating is to provide an ink receptive surface to hold the ink, permit rapid drying, and develop maximum color.

The latex in paint formulations is present in a large enough quantity to allow the latex particles to coalesce with one another and form a semi-continuous network of a polymer around the pigment particles. The resultant network is porous enough to allow air to pass through the dried paint film. By contrast, the small amount of latex used in paper coatings prevents the individual latex particles from coalescing with one another to form a continuous or semi-continuous film. Pigment binding is accomplished primarily by "spot-welds" of latex particles to pigment and the fibers of the paper substrate. The latex or binder should also be capable of binding pigment without interferring with the pigment printing qualities. This may be accomplished by selecting a latex that has exceptonal bonding properties and can be used in relatively low amounts, and which will not interfere with the various inks used for printing such as gravure, off-set and letter-press inks. The latex should also be able to withstand printing stresses applied to the coating during printing. Because synthetic latex compositions tend to remain on the surface of a porous substrate such as paper as opposed to penetration and mechanical bonding obtained with solution coatings, the ability of the latex to bond clay particles to one another and the fibers of a paper-type substrate becomes all the more critical.

In the past it was believed that polymer hardness was a critical factor in selecting latex compositions for paper coating. The minimum film forming temperature (MFT) has been used to define this requirement and is the lowest temperature at which the force causing coalescence of the particle (the retreating capillary water-air polymer interface) exceeds the modulus (G) of the polymer particle resisting this pressure. It has been reported in the literature that polymers suitable as pigment binders for paper coatings must have MFT values below 0° C. The deformability of the polymer particle is critical in this respect in order to achieve "spot welding" of clay at binder concentrations of from about 5–15% by weight of the pigment. It had also been reported that this limitation prevents homopolymers of vinyl acetate and other polymers of similar or greater hardness from effectively bonding clay and holding it to cellulose at low binder levels. This phenomenon has also been reported with regard to copolymer functional groups in the latex, i.e., polymer hardness reportedly affects the adhesion of binders having otherwise adequate levels of hydrogen bonding groups.

The present invention relates to the discovery that a crystalline copolymer latex of at least 60 wt. percent ethylene and from about 3 to about 30 wt. percent of an alpha-beta olefinically unsaturated organic carboxylic acid and from 0 to about 37 wt. percent of a vinylidene compound copolymerized therewith may be used as a pigment binder, especially in paper coatings whereby the latex binder "spot welds" pigment as contrasted to pigment binding by forming a semi-continuous film around the pigment particles.

The pigment binding properties of this latex are unexpected in view of the crystallinity of the polymer, which is anywhere from about 10% to about 70%, and the prior art teaching that so-called "hard" polymers are not suitable in this application.

It has also been unexpectedly found that even though low quantities of latex are used in the paper coatings of this invention excellent gloss is obtained which is an important property of the coating in commercial applications where appearance is critical.

The alpha-beta olefinically unsaturated organic carboxylic acid employed in the polymer latex of this invention comprise monocarboxylic and dicarboxylic unsaturated straight chain or cyclic polymerizable acids known in tne art having from about 3 to about 15 carbon atoms. Preferred acids for the polymer latex of this invention comprise the acrylic acids i.e., acrylic acid, methacrylic acid, crotonic acid as well as the dicarboxylic acids, itaconic acid and citraconic acids, maleic acid and fumaric acid and mixtures of these acrylic acids and dicarboxylic acids especially the 2 component and 3 component mixtures thereof. Especially preferred acids comprise acrylic acid, methacrylic acid or mixtures thereof.

The optional vinylidene compound polymerized with the polymer latex of this invention comprises a compound of the formula:

(I) 

$$R_3CH=C-R_2 \quad | \quad R_1$$

where $R_1$ may be hydrogen, methyl or halogen and $R_2$ may be halogen or alkanoyloxy group of the formula:

(II) 

$$R_4-\overset{\overset{O}{\|}}{C}-O-$$

where $R_4$ is a 1 to about 4 carbon atom alkyl group; $R_2$ and $R_3$ may also be a carboalkoxy group of the formula:

(III) 

$$-\overset{\overset{O}{\|}}{C}-O-R_5$$

where $R_5$ is a 1 to about 12 carbon atom alkyl group; $R_3$ may also be hydrogen; or $R_2$ may be a hydroxyl as in the case of a vinyl alcohol moiety in the polymer chain of the latex. Mixtures of the various aforementioned vinylidene compounds are also within the broad scope of the invention, especially two component and three component mixtures. When $R_1$ and/or $R_2$ are halogen, the preferred halogens comprise chlorine, fluorine and bromine.

Preferred examples of vinylidene compounds within Formula I comprise the 1 to about 12 carbon alkanol esters of acrylic, methacrylic, itaconic, citraconic, crotonic, maleic and fumaric acid; especially the acrylic and methacrylic acid esters; vinyl formate, vinyl acetate, vinyl propionate, vinyl butyrate, vinyl alcohol, vinyl chloride, and vinylidene chloride.

The inclusion of vinyl alcohol as one of the foregoing vinylidene compounds is not intended to imply that these vinylidene compounds are all monomers which may be copolymerized with the other monomers that make up the latex of this invention. It is well known in the art that vinyl alcohol does not exist as a monomer and polymers containing this moiety are made by polymerizing a vinyl ester such as vinyl acetate and back hydrolyzing to obtain the vinyl alcohol structure. For this reason, the foregoing vinylidene compounds are described as optional components in the polymer latex and not as monomeric compounds.

Anywhere from about 3 to about 30 parts by weight (solids basis) of the latex employed in the present invention may be used per 100 parts by weight of a mineral pigment especially those pigments used for paper coating. Suitable pigments in this regard comprise any clays falling within the class of minerals generally known as allophane, kaolinite, halloysite, montmorillonite, illite, chlorite, vermiculite, sepiolite, polygorskite, and attapulgite clays and specifically, residual or primary kaolins, sedimentary or secondary kaolins, magnesium silicate, bentonite, calcium carbonate, calcium sulfate, magnesium carbonates, magnesium oxide, pyrophylite, mica, pumice, silica, diatomite, barium sulfate, satin white, litharge, lithopone, titanium dioxide, zinc oxide and the like and mixtures thereof.

Protein and/or starch or equivalent carbohydrate adhesives may optionally be employed in an amount from 0–95% preferably 0–75% (solids basis) based on the aforementioned copolymer latex (solids basis). Examples of some of the suitable art known proteins include soya protein, cotton seed protein, peanut protein, corn protein (zein), yeast protein, casein, animal glue, hydrolyzed leather scrap, blood serum and gelatin as well as mixtures thereof. Starches that may be used in this regard comprise starches obtained from corn, potatoes, tapioca, rice, wheat, and the other cereal flours as well as mixtures thereof. Starches of these types may be solubilized by methods well known in the art. Additionally, natural "gums" as the aforementioned starches. Gums and the methods of preparation and use of starches and proteins are described in Kirk-Othmer Encyclopedia of Chemical Technology, Interscience (1951) and are generally art known.

The alpha-beta olefinically unsaturated acids of the polymer latex may also be neutralized with an alkaline compound such as an alkaline hydroxide e.g., the hydroxides of the Group I–A metals, specifically lithium, sodium, potassium, rubidium and cesium as well as the Group II–A metals such as beryllium, magnesium, calcium, strontium and barium. Ammonia, art known organic amines, and ammonium hydroxide are also suitable in this regard, all of which are intended to be included within the definition of alkaline compounds. The alkaline compound is added to the latex to maintain the pH on the alkaline side, especially from a pH of about 7.1 to about 9 and preferably from about 7.25 to about 8.5, provided, however, that the alkaline compound is not added in such an amount so as to solubilize the latex particles or cause it to dissolve in its aqueous continuous phase. The alkaline compound, thus, is preferably added in an amount so that the solid latex particles are not dissolved and the dispersion of solids in a continuous aqueous liquid phase is maintained.

When ammonium hydroxide is used as the alkaline compound it may be removed from the dried coating by volatilization at elevated temperatures, thus, converting the polymer back to its original composition.

The advantages of employing the alkaline compound in the coating compositions of the present invention are an alkaline pH stabilizes the latexes, aids in the dispersion of some of the mineral pigments and a slightly alkaline pH minimizes or substantially eliminates corrosion problems with the machinery used for applying the coating to paper.

The advantage of retaining the alkaline compound in the latex coating after it has been applied to paper is that the coated paper may be reworked with paper furnish as scrap as it is after coating or by the addition of sufficient alkaline compound to solubilize or substantially solubilize the polymer latex. Previously, synthetic latexes used in the paper coating arts were not amenable to reworking, since the latex could not be broken down by conventional paper making operations. Consequently, any scrap produced could not be re-used by heating, digestion, etc.

The paper substrate on to which these novel polymer latex coatings are applied may be conventional paper made from wood cellulose fibers by processes well known in the art, or may be made up of other fiber materials, alone or in combination with the wood cellulose fibers and include vegetable fibers or vegetable derived fibers such as cotton, rayon, cellulose acetate, cellulose butyrate, cellulose nitrate, ramie, jute, hemp, sisal and linen fibers, protein fibers such as silk and casein fibers as well as the synthetic fibers known in the art such as polyester fibers, polyamide fibers, vinyl fibers and the like. Mineral fibers such as asbestos, rock wool, and others e.g., boron, steel fibers and the like may also be used as well as combinations thereof. The preferred papers, however, comprise those made from cellulosic fibers or compositions.

The polymers of the present invention may be prepared by a continuous emulsion polymerization process which involves continuously charging to a reactor, operated at high temperature and pressure and with thoroughly mixing to maintain substantially uniform conditions of temperature, pressure and concentration throughout, the polymerizable monomers, water, a persulfate catalyst, and one or more surfactants, and continuously recovering the latex produced. The exact manner in which the several components are charged to the reactor, or the particular type of reactor utilized, are not critical. A convenient procedure is to charge the water, surfactant and catalyst in one stream, the ethylene as a second stream, and the olefinically unsaturated acid and, if desired, additional vinylidene comonomer, as a third stream.

Polymerization temperatures may range from about 100° C. to about 160° C., and more preferably are in the range of about 110° C. to about 150° C. While it is ordinarily desirable to utilize the highest temperature possible, within the above range, so as to maximize heat transfer and optimize the physical properties of the polymer, the optimum temperature for the process is dependent upon the particular catalyst and surfactant employed and upon the composition of the particular interpolymer being produced. Thus, for example, with an ethylene acrylic acid/vinyl acetate terpolymer, it is usually desirable to keep the temperature in the range of about 110° C. to about 120° C. to avoid excessive cross-linking or branching which results in the formation of a polymer which lacks strength.

The polymerization is conducted at a pressure of about 5,000 p.s.i.g. and preferably at least about 10,000 p.s.i.g. The main effect of an increase in pressure is to increase the reaction rate and since there are no significant detrimental effects accruing to the use of high pressures the polymerization is ordinarily conducted at the highest pressure which is practical as dictated by the requirements of safety and economics. Thus, pressure in the range of about 5,000 p.s.i.g. to about 50,000 p.s.i.g., or more, may be used, but striking a balance between the competing considerations will ordinarily indicate the use of a pressure in the range of about 10,000 to about 30,000 p.s.i.g.

The ethylene, the olefinically unsaturated acid, and, optionally, the copolymerizable vinylidene monomer are charged to the reactor in proportions depending upon the desired compositions of the ethylene interpolymer. As employed herein and in the appended claims, the term "polymerizable monomer" is used to refer to the total charge to the reactor of ethylene, olefinically unsaturated acid, and copolymerizable vinylidene monomer. Thus, the polymerizable monomer may consist of, for example, ethylene and acrylic acid; or ethylene and methacrylic acid; or ethylene, ethyl acrylate and acrylic acid, or ethylene, vinyl acetate, and acrylic acid; or ethylene, methyl methacrylate and methacrylic acid; or ethylene, acrylic acid, ethyl acrylate; and so forth. To produce the ethylene copolymers contemplated herein, the polymerizable monomer charge to the reactor will consist of at least 50 mole percent ethylene and from about 0.2 to about 15 mole percent of an olefinically unsaturated acid with any remaining balance being a copolymerizable vinylidene monomer. Thus, the polymerizable monomer might, for example, consist of 99 percent ethylene and 1 percent acrylic acid; or 90 percent ethylene and 10 percent methacrylic acid; or 85 percent ethylene and 15 percent acrylic acid; or 70 percent ethylene, 15 percent acrylic acid and 15 percent ethyl acrylate; or 60 percent ethylene, 10 percent acrylic acid 30 percent vinyl acetate; or 60 percent ethylene, 5 percent acrylic acid, 20 percent ethyl acrylate, and 15 percent methyl methacrylate; and so forth (all illustrative compositions given being in mole percent).

The rate at which polymerizable monomer is charged to the reactor is at least about 50 lbs. per hour per cubic foot of reactor volume, and preferably a rate in the range of about 100 to about 300 lbs. per hour per cubic foot of reactor volume. This is the total rate of the combined charge of all of the monomers, i.e. ethylene plus carboxylic acid plus any other copolymerizable aliphatic monomer optionally included. The maximum rate at which polymerizable monomer can be fed is limited primarily by the necessity of dissipating the large amount of heat generated by the polymerization reaction and is thus, in part, determined by reactor design. Operation at a rate below the minimum specified is uneconomical and frequently also undesirable from the viewpoint of the physical properties of the resulting latex.

Water is charged to the reactor in an amount dependent upon the rate of charge of polymerizable monomer and upon the desired solids content of the ethylene interpolymer latex. Latexes having the desired combination of properties described herein can be produced by charging the reactor with water at a rate of about 0.3 to about 3 lbs. per lb. of polymerizable monomer undergoing conversion to polymer, and more preferably about 0.8 to about 1.5 lbs. per lb. of polymerizable monomer undergoing conversion to polymer.

As indicated hereinbefore, the emulsion polymerization process utilizes a persulfate compound as catalyst. More specifically, the catalyst may be selected from the group consisting of ammonium persulfate ($(NH_4)_2S_2O_8$) and alkali metal persulfates, e.g. sodium persulfate ($Na_2S_2O_8$) or potassium persulfate ($K_2S_2O_8$). The preferred catalyst is potassium persulfate. These compounds are well known emulsion polymerization catalysts and function as water-soluble, oil-insoluble, free radical initiators.

The amount of catalyst employed is not critical as long as it is present in sufficient concentration to promote the polymerization, i.e. a catalytically effective amount. An amount of at least about 0.001 lb. per lb. of polymerizable monomer undergoing conversion to polymer is ordinarily required. Generally speaking, amounts of from about 0.001 to about 0.02 lb. per lb. of polymerizable monomer undergoing conversion to polymer are employed, with preferred amounts being in the range of about 0.002 to about 0.007 lb. per lb.

The use of a surfactant is an essential feature of the polymerization process. The surfactant serves a dual function in that it assists in the initiation of new polymer particles and also helps to stabilize the latex. However, from the standpoint of the end use of the latex, e.g., in paper coating, the use of a surfactant in the process is usually highly detrimental since it will end up as a contaminant of the coating and will adversely affect the properties of the polymer. Accordingly, it is desirable that the concentration of surfactant be held to a minimum.

The surfactant in manufacturing the polymer latex should be chemically stable and capable of forming abundant miscelles under the operative conditions of the process. As is well known in the polymer art, the formation of micelles, i.e. small clusters of surfactant molecules, is necessary to the formation and growth of the polymer particles composing a latex. The concentration of surfactant at which micelles begin to form in detectable quantities is called the critical micelle concentration and is dependent upon the structure of the surfactant and upon the temperature.

A single surfactant or a mixture of two or more surfactants may be employed. The particular compounds to be used will be dictated primarily by the subsequent application for which the latex is intended, for example, if the latex is to be used to form a coating which would come in contact with foodstuffs then toxicological properties of the surfactant would be a prime consideration. Anionic surfactants are particularly effective, especially those that have a low critical micelle concentration at room temperature, e.g. 0.1 weight percent or less. A combination of an anionic surfactant and a non-ionic surfactant may be employed, and such combination has been found to be particularly effective in promoting latex stability in the presence of multivalent metal ions such as calcium, magnesium or aluminum.

Particular classes of anionic surfactants that may be advantageously employed in the process of this invention are the amine or alkali metal salts of alkylaryl sulfonates, such as sodium dodecylbenzenesulfonate, the isopropylamine salt of dodecylbenzenesulfonic acid, and the like; and the bis(alkyl)sulfosuccinates such as sodium bis(octyl)sulfosuccinate, sodium bis(tridecyl)sulfosuccinate, and the like.

The amount of surfactant employed must be sufficient to effect the dual functions of assisting in the initiation of new polymer particles and aiding in stabilizing the latex which is formed. However, consistent with these requirements, it is ordinarily desirable to employ the smallest amount of surfactant possible and thereby minimize the detrimental effects of the surfactant on polymer properties. Amounts of surfactant in the range of about 0.005 to about 0.05 lb. per lb. of polymerizable monomer undergoing conversion to polymer are operable, while preferred amounts are in the range of about 0.01 to about 0.03 lb. per lb. of polymerizable monomer undergoing conversion to polymer.

Since the ethylene interpolymer latexes within the scope of this invention always contain some carboxylic acid, the pH in the reactor must be maintained at a low level to avoid inhibition of the polymerization reaction. Ordinarily the pH will be maintained at a level of below about 4 and preferably below about 3. After the latex leaves the reactor, it is generally desirable to increase the pH to 7 or higher, by, for example, addition of ammonium hydroxide, potassium hydroxide or sodium hydroxide, in order to minimize corrosion problems and to help stabilize the latex in storage.

The polymerization is conducted at the highest conversion compatible with production of a high quality product. In terms of ethylene, the conversion is typically in the range of about 40 to about 90 percent, i.e. about 40 to about 90 percent of the ethylene charged to the reactor is converted to polymer. More frequently, the conversion of ethylene will be in the range of 60 to 80 percent. Since the olefinically unsaturated acid component generally polymerizes much more rapidly than ethylene under the same conditions, the conversion of the acid will ordinarily be substantially complete, e.g. 98 percent or more. The optional copolymerizable vinylidene monomer will generally also polymerize more rapidly than ethylene so the degree of conversion of such monomer will usually exceed that of the ethylene.

The flow rates of the several components charged to the reactor, as set forth hereinabove, are such that the residence time in the reactor is relatively brief. Actual residence time, is, of course, not a single value but rather there is a wide distribution of actual residence times; however, the nominal residence time may be calculated from the feed rates and the reactor volume. Under the operating conditions described herein, the nominal residence time, i.e. the value obtained by dividing the reactor volume in ft.$^3$ by the total volumetric feed rate in ft.$^3$/hr., is ordinarily below about 0.5 hour and ranges down to as low as about 0.1 hour, or less.

Process conditions, may be selected within the limits specified hereinabove, to provide a space productivity of at least about 25 lbs. of polymer per hour per cubic foot of reactor volume. Typically, a space productivity in excess of 50 and as high as 200 lbs. of polymer per hour per cubic foot of reactor volume, or even higher, can be achieved by optimization of process conditions.

The size of the polymer particles in the ethylene interpolymer latexes of this invention is in the range recognized by the art as characterizing a latex, i.e. below one micron, and ordinarily there is a broad particle size distribution. In ethylene interpolymer latexes produced in accordance with the teachings herein, substantially all of the polymer particles are in the size range of from about 0.01 to about 1 micron, especially from about 0.01 to about 0.7 with the average particle size preferably being in the range of about 0.2 to about 0.5 micron. Melt index may vary from <0.1 to about 300 especially from <0.1 to about 200. The density of the copolymer latex is generally below, and preferably from about 0.945 to about 0.975. Based on density, crystallinity can vary from about 10 to about 70%. Filming temperature varies between about 70° C. to about 100° C.

The total solids content of the latexes described herein will usually exceed about 40 percent and solids contents of well above this value, e.g., in the range of 50 to 60 percent and, in some instances, even higher can be achieved by control of the process variables. Accordingly, the novel latexes are well suited to coating applications where a high solids content is essential to minimize the amount of water which must be evaporated.

These latexes have a far lower surfactant content than latexes produced by the teachings of the prior art in which a high content of surfactant is essential to provide adequate stability. These latexes will typically have a total surfactant content of less than 5 weight percent, based on total weight of solids in the latex, whereas the latex products known to the art have typically exhibited a total surfactant content of as high as 10 to 15 weight percent, or more, on the same basis.

The ethylene interpolymers of this invention are copolymers, terpolymers, or higher interpolymers, containing as essential components both ethylene and an olefinically unsaturated acid as hereinbefore described. The carboxylic acid promotes latex stability and improves polymer properties. The optional incorporation of a copolymerizable vinylidene monomer, as hereinbefore described, usually results in a decrease in the crystallinity of the polymer. Accordingly, the copolymerizable vinylidene monomers are added in an amount so that from about 10 to about 70% crystallinity is maintained in the polymer latex.

Ethylene interpolymers within the scope of this invention exhibit physical properties extending over a broad spectrum with the properties of a particular polymer depending upon both its composition and the process conditions employed in its production. The copolymers of low carboxylic acid content, e.g. copolymers composed of ethylene and acrylic acid and containing up to 10 percent by weight of acrylic acid, are tough and strong and will form a film substantially equivalent in performance to extruded film from bulk polymerized polyethylene. They exhibit far higher ultimate tensile strength and ultimate elongation than ethylene polymers available in latex form heretofore ad are particularly distinguished from the prior art in this respect, since stable ethylene polymer latexes heretofore produced directly by emulsion polymerization have invariably been composed of polymer which was weak and brittle.

The following non-limiting examples are given to further illustrate some of the features of the present invention.

Several latexes are evaluated by formulating them in three basic coating colors as described below.

(1) STANDARD LATEX-PROTEIN COATING COLOR FOR PAPERBOARD

| Ingredients: | Parts by weight (solids) |
|---|---|
| Predispersed H.T. kaolin clay | 100.0 |
| Tetrasodium pyrophosphate (TSPP) | 0.1 |
| Low viscosity soya protein | 2.0 |
| Latex | 14.0 | pH=8.5 to 9.0
Percent total solids=55

(2) STANDARD CASEIN-LATEX COATING COLOR FOR PAPER

| Ingredients: | Parts by weight (solids) |
|---|---|
| Predispersed H.T. clay | 100.0 |
| TSPP (tetra sodium pyrophosphate) | 0.1 |
| Casein | 8.0 |
| Latex | 8.0 | pH=8.5
Percent total solids=45

(3) STANDARD STARCH-LATEX COATING COLOR FOR PAPER

| Ingredients: | Parts by weight (solids) |
|---|---|
| Predispersed H.T. clay | 100.0 |
| TSPP | 0.1 |
| Oxidized corn starch | 10.0 |
| Latex | 10.0 | pH=8.0 to 8.5
Percent total solids=55

In preparing each of the above formulations, the clay is first dispersed in water under high shear to 70% total solids. Aqueous solutions of protein and casein are prepared by heating a water slurry of these materials containing 14% aqueous ammonia (based on protein) at 55 to 65° C. for 30 minutes. Starch solutions are prepared by heating starch in water at 95 to 98° C. for 15 minutes. Solutions of these natural adhesives are then added to the pigment dispersion followed by latex and water to the desired total solids.

Coating colors are applied by hand to standard bleached paperboard or paper rawstocks at 15 lbs. per ream (25 x 38—500) with a #14 wire wound rod. Generally the coatings are then dried on a steam heated drum for 30 seconds at 95° C. and calendered or supercalendered under the desired conditions.

The values reported in the following tables relative to "I.G.T. Pick," "Wet Rub," "Brightness," "K and N Ink," and "75° Gloss" are obtained according to the methods described in the publication UCAR Latex 40, pp. 21-24 of the Union Carbide Corporation (No. F-41400); viscosity is measured with a Brookfield model RVT viscosimeter.

Several coating colors are prepared and evaluated with these latexes the results of which are reported in the following tables. The latexes employed in these formulations and reported in the following tables were prepared according to the procedures outlined herein.

TABLE 1.—COATING PROPERTIES OF LATEXES
[Standard latex-protein formulation]

| Latex No. | Latex composition* | Melt index | Coating color visc. (cps.) 10 r.p.m. | Coating color visc. (cps.) 100 r.p.m. | I.G.T. Pick (f.p.m.) #6 ink | I.G.T. Pick (f.p.m.) #7 ink | Uncalendered samples Wet rub | Uncalendered samples Bright-ness | Uncalendered samples K and N ink | Calendered samples, 500 p.l.i., 65° C., 2 passes 75° gloss | I.G.T. Pick (f.p.m.) #6 ink | I.G.T. Pick (f.p.m.) #7 ink | Wet rub | Bright-ness | K and N ink | 75° gloss |
|---|---|---|---|---|---|---|---|---|---|---|---|---|---|---|---|---|
| 1 | E(95)/AA(5) | 0.1 | 345 | 115 | 0 | 0 | 86 | 84 | 40 | 29 | 85 | 0 | | 78 | 48 | 77 |
| 2 | E(73)/VA(22)/AA(5) | | 940 | 210 | 160 | | 99 | 82 | 37 | 26 | 220 | 175 | | 78 | 50 | 70 |
| 3 | E(65)/EA(30)/AA(5) | | 570 | 145 | 230 | 0 | 98 | 81 | 42 | 26 | 335 | 155 | | 78 | 43 | 59 |
| 4 | E(65)/EA(30)/AA(5) | | 735 | 175 | 155 | | 95 | 82 | 45 | 18 | 340 | 260 | | 77 | 58 | 77 |
| 5 | E(82)/EA(13)/AA(5) | | 1,180 | 265 | 170 | | 82 | 83 | 42 | 31 | 220 | 185 | | 77 | 48 | 75 |
| 6 | E(82)/VA(13)/AA(5) | | 470 | 145 | 120 | | 99 | 83 | 42 | 20 | 145 | 125 | | 77 | 47 | 75 |
| 7 | E(72)/EA(20)/AA(5) | | 730 | 170 | 260 | 0 | 73 | 82 | 41 | 27 | 230 | 0 | 90 | 78 | 43 | 57 |
| 8 | E(95)/AA(5) | 10 | 350 | 125 | 0 | 0 | 17 | 83 | 40 | 37 | 0 | 0 | 12 | 81 | 40 | 69 |

*E=ethylene; AA=acrylic acid; EA=ethyl acrylate; VA=vinyl acetate.

TABLE 2.—FIRST COATING EVALUATION OF AN ETHYLENE LATEX*
[Standard latex-protein formulation]

| Latex No. | Latex composition** | Percent binder | Coating color visc. (cps.) 10 r.p.m. | Coating color visc. (cps.) 100 r.p.m. | I.G.T. Pick resistance (f.p.m.) #6 I.P.I. Ink | Bright-ness | K and N Ink | Wet-Rub resistance |
|---|---|---|---|---|---|---|---|---|
| 9 | E(78)/VA(20)/AA(2) | 12 | 1,060 | 275 | 0 | 84 | 44 | 90 |
| 9 | E(78)/VA(20)/AA(2) | 16 | 1,300 | 555 | 0 | 84 | 40 | 97 |
| 9 | E(78)/VA(20)/AA(2) | 20 | 1,800 | 515 | 75 | 84 | 40 | 96 |

*Supercalendered: 66° C., 1,000 p.l.i., 2 passes.
**E=ethylene; VA=vinyl acetate; AA=acrylic acid.

TABLE 3.—PROPERTIES OF LATEX-CASEIN COATINGS*

| Latex No. | Coating color visc. (cps.) 10 r.p.m. | Coating color visc. (cps.) 100 r.p.m. | I.G.T. Pick (f.p.m.) #4 Ink | Wet-Rub resistance 1 day | Wet-Rub resistance 1 week | Bright-ness | K and N Ink | 75° Gloss |
|---|---|---|---|---|---|---|---|---|
| 3 | 4,480 | 2,825 | 550 | 47 | 81 | 79 | 66 | 42 |
| 7 | 2,160 | 1,550 | 470 | 52 | 84 | 79 | 63 | 37 |
| 8 | 1,440 | 1,070 | 330 | 62 | 79 | 80 | 52 | 44 |

*Supercalendered: 66° C., 1000 p.l.i., 2 passes.

TABLE 4.—PROPERTIES OF LATEX-STARCH COATINGS*

| Latex No. | Coating color visc. (cps.) 10 r.p.m. | Coating color visc. (cps.) 100 r.p.m. | I.G.T. Pick (f.p.m.) #3 Ink | I.G.T. Pick (f.p.m.) #4 Ink | Wet-Rub 1 day | Wet-Rub 1 week | Bright-ness | K and N Ink | 75° Gloss |
|---|---|---|---|---|---|---|---|---|---|
| 3 | 1,400 | 255 | 605 | 260 | 12 | 12 | 78 | 48 | 58 |
| 7 | 1,555 | 300 | 670 | 330 | 8 | 15 | 78 | 55 | 54 |
| 8 | 1,480 | 295 | 355 | 155 | 7 | 8 | 79 | 45 | 61 |

*Supercalendered: 66° C., 1,000 p.l.i., 2 passes.

TABLE 5.—COATING PROPERTIES OF LATEXES
[Standard latex-protein formulation]

| Latex No. | Latex description* | Coating color visc. (cps.) 10 r.p.m. | Coating color visc. (cps.) 100 r.p.m. | I.G.T. Pick (f.p.m.) #6 Ink | Wet-Rub resistance | Uncalendered Bright-ness | Uncalendered K and N Ink | Uncalendered 75° Gloss | Orange Gloss Ink | Vanceometer 20 sec. | Vanceometer 60 sec. |
|---|---|---|---|---|---|---|---|---|---|---|---|
| 9 | E(95)/AA(5) | 1,420 | 290 | 70 | 20 | 82 | 31 | 34 | 29 | 56 | 54 |
| 10 | E(65)/EA(30)/AA(5) | 1,680 | 335 | 310 | 80 | 81 | 41 | 19 | 79 | 75 | 63 |
| 11 | E(45)/EA(50)/AA(5) | 720 | 180 | 285 | 15 | 80 | 37 | 19 | 75 | 74 | 65 |
| 12 | E(80)/AA(20) | 1,160 | 275 | 670 | 97 | 79 | 50 | 14 | 81 | 89 | 87 |

TABLE 5—Continued

| | | Calendered 65° C., 170 p.l.i., 2 passes | | | | | | | | | |
|---|---|---|---|---|---|---|---|---|---|---|---|
| Latex No. | Latex description* | Coating color visc. (cps.) | | I.G.T. Pick (f.p.m.) #6 Ink | Wet-Rub resistance | Bright-ness | K and N Ink | 75° Gloss | Orange Gloss Ink | Vanceometer | |
| | | 10 r.p.m. | 100 r.p.m. | | | | | | | 20 sec. | 60 sec. |
| 9 | E(95)/AA(5) | 1,420 | 290 | 115 | 26 | 80 | 41 | 70 | 56 | 92 | 92 |
| 10 | E(65)/EA(30)/AA(5) | 1,680 | 335 | 385 | 92 | 80 | 43 | 52 | 88 | 88 | 84 |
| 11 | E(45)/EA(50)/AA(5) | 720 | 180 | 380 | 98 | 79 | 43 | 55 | 80 | 90 | 89 |
| 12 | E(80)/AA(20) | 1,160 | 275 | 670 | 30 | 78 | 51 | 35 | 88 | 93 | 93 |

| | | Calendered 120° C., 500 p.l.i., 2 passes | | | | | | | | | |
|---|---|---|---|---|---|---|---|---|---|---|---|
| Latex No. | Latex description* | Coating color visc. (cps.) | | I.G.T. Pick (f.p.m.) #6 Ink | Wet-Rub resistance | Bright-ness | K and N Ink | 75° Gloss | Orange Gloss Ink | Vanceometer | |
| | | 10 r.p.m. | 100 r.p.m. | | | | | | | 20 sec. | 60 sec. |
| 9 | E(95)/AA(5) | 1,420 | 290 | 300 | 97 | 75 | 58 | 73 | 92 | 89 | 88 |
| 10 | E(65)/EA(30)/AA(5) | 1,680 | 335 | 520 | 97 | 77 | 60 | 69 | 93 | 89 | 89 |
| 11 | E(45)/EA(50)/AA(5) | 720 | 180 | 550 | 98 | 97 | 53 | 70 | 90 | 89 | 90 |
| 12 | E(80)/AA(20) | 1,160 | 275 | 670 | 90 | 77 | 64 | 63 | 92 | 93 | 93 |

*E=ethylene; AA=acrylic acid; EA=ethyl acrylate.

TABLE 6

[Standard latex-protein formulation]

| | | Uncalendered samples | | | | | | | |
|---|---|---|---|---|---|---|---|---|---|
| Latex No. | Addition of alkaline hydroxide | Coating color visc. (cps.) | | I.G.T. Pick resistance (f.p.m.) | | Wet-Rub | Bright-ness | K and N Ink | 75° Gloss |
| | | 10 r.p.m. | 100 r.p.m. | #6 Ink | #7 Ink | | | | |
| 9 | NH₄OH to pH 7.0 | 550 | 165 | 130 | 95 | 88 | 80 | 35 | 33 |
| 9 | NaOH to pH 7.8 | 850 | 200 | 0 | 0 | 60 | 82 | 37 | 37 |
| 9 | NH₄OH to pH 7.0 | 600 | 160 | 85 | 0 | 94 | 82 | 37 | 35 |
| 10 | do | 650 | 175 | 355 | 205 | 95 | 80 | 40 | 33 |
| 10 | NaOH to pH 7.0 | 600 | 175 | 390 | 300 | 98 | 80 | 42 | 23 |

| | | Samples calendered 65° C. and 170 p.l.i., 2 passes | | | | | | | |
|---|---|---|---|---|---|---|---|---|---|
| Latex No. | Addition of alkaline hydroxide | Coating color visc. (cps.) | | I.G.T. Pick resistance (f.p.m.) | | Wet-Rub | Bright-ness | K and N Ink | 75° Gloss |
| | | 10 r.p.m. | 100 r.p.m. | #6 Ink | #7 Ink | | | | |
| 9 | NH₄OH to pH 7.0 | 550 | 165 | | 120 | 91 | 81 | 37 | 37 |
| 9 | NaOH to pH 7.8 | 850 | 200 | | 85 | 61 | 82 | 33 | 38 |
| 9 | NH₄OH to pH 7.0 | 600 | 160 | | 225 | 94 | 81 | 35 | 37 |
| 10 | do | 650 | 175 | | 225 | 97 | 79 | 42 | 22 |
| 10 | NaOH to pH 7.0 | 600 | 175 | | 220 | 99 | 79 | 40 | 33 |

| | | Samples calendered 120° C. and 500 p.l.i., 2 passes | | | | | | | |
|---|---|---|---|---|---|---|---|---|---|
| Latex No. | Addition of alkaline hydroxide | Coating color visc. (cps.) | | I.G.T. Pick resistance (f.p.m.) | | Wet-Rub | Bright-ness | K and N Ink | 75° Gloss |
| | | 10 r.p.m. | 100 r.p.m. | #6 Ink | #7 Ink | | | | |
| 9 | NH₄OH to pH 7.0 | 550 | 165 | 375 | 190 | 99 | 77 | 45 | 70 |
| 9 | NaOH to pH 7.8 | 850 | 200 | 330 | 175 | 99 | 78 | 43 | 70 |
| 9 | NH₄OH to pH 7.0 | 600 | 160 | 285 | 145 | 99 | 79 | 49 | 66 |
| 10 | do | 650 | 175 | 475 | 235 | 97 | 78 | 50 | 54 |
| 10 | NaOH to pH 7.0 | 600 | 175 | 500 | 200 | 99 | 78 | 51 | 58 |

TABLE 7.—COATING PROPERTIES OF LATEXES

[Standard latex-protein formulation]

| | Drum dried 30 sec. at 95° C. | | | | | | |
|---|---|---|---|---|---|---|---|
| | Coating visc. (cps.) #3 sp. 50° C. | | I.G.T. Pick (f.p.m.) #7 Ink | Wet-Rub 50 g./ 50 cts. (percent trans.) | Bright-ness | K and N Ink | 75° Gloss |
| | 10 r.p.m. | 100 r.p.m. | | | | | |
| Latex No.: | | | | | | | |
| 9 | 820 | 235 | 115 | 91 | 82 | 46 | 33 |
| 10 | 500 | 140 | 225 | 95 | 80 | 47 | 21 |

| | Drum dried plus calendered 65° C. at 170 p.l.i., 2 passes | | | | | | |
|---|---|---|---|---|---|---|---|
| | Coating visc. (cps.) #3 sp. 50° C. | | I.G.T. Pick (f.p.m.) #7 Ink | Wet-Rub 50 g./ 50 cts. (percent trans.) | Bright-ness | K and N Ink | 75° Gloss |
| | 10 r.p.m. | 100 r.p.m. | | | | | |
| Latex No.: | | | | | | | |
| 9 | 820 | 235 | 125 | 97 | 81 | 50 | 69 |
| 10 | 500 | 140 | 255 | 99 | 80 | 51 | 52 |

| | Drum dried plus calendered 120° C. at 500 p.l.i., 2 passes | | | | | | |
|---|---|---|---|---|---|---|---|
| | Coating visc. (cps.) #3 sp. 50° C. | | I.G.T. Pick (f.p.m.) #7 Ink | Wet-Rub 50 g./ 50 cts. (percent trans.) | Bright-ness | K and N Ink | 75° Gloss |
| | 10 r.p.m. | 100 r.p.m. | | | | | |
| Latex No.: | | | | | | | |
| 9 | 820 | 235 | 295 | 97 | 76 | 66 | 87 |
| 10 | 500 | 140 | 325 | 99 | 77 | 62 | 82 |

Latex coatings described in tables one through seven are prepared without protein, casein or starch and excellent paper coatings and coated paper are also obtained. When the other latexes described herein are employed according to the formulations reported in tables one through seven with or without the starch, protein or casein, substantially the same results are obtained.

What is claimed is:
1. A composition of matter consisting essentially of
 (1) from about 3 to about 30 parts by weight of a binder composed of
  (a) a latex of at least 60% ethylene and from about 3 to about 30% of an alpha-beta olefinically unsaturated organic carboxylic acid, and from 0 to about 37% of a vinylidene compound polymerized therewith, said latex being obtained by polymerizing ethylene monomer, a monomer of an alpha-beta olefinically unsaturated organic carboxylic acid and the monomeric precursor of said vinylidene compound at temperatures from about 100° C. to about 160° C. and pressures from about 5,000 p.s.i.g. to about 50,000 p.s.i.g., said latex being characterized by a particle size of from about 0.1 to about 1 micron, a melt index of from greater than 0.1 to about 300, filming tempertures from about 70° to about 100° C. and a density from about 0.945 to about 0.975;
  (b) from 0 to about 95 percent based on said copolymer of a natural adhesive selected from the group consisting of protein adhesives and carbohydrate adhesives;
 (2) 100 parts by weight of a mineral pigment, said copolymer latex being from about 10% to about 70% crystalline.
2. The composition of claim 1 wherein said alpha-beta olefinically unsaturated acid is selected from the group consisting of acrylic acid, methacrylic acid, crotonic acid, itaconic acid, citraconic acid, maleic acid, fumaric acid and mixtures thereof.
3. The composition of claim 2 where said vinylidene compound is selected from a member of the group consisting of 1 to about 12 carbon atom alkanol esters of acrylic, methacrylic, itaconic, citraconic, maleic and fumaric acid, vinyl formate, vinyl acetate, vinyl propionate, vinyl butyrate, vinyl alcohol, vinyl chloride, vinylidene chloride and mixtures thereof.
4. The composition of claim 3 where said organic acid is partially neutralized with an alkaline compound selected from a member of the group consisting of the Group I-A metal hydroxides and the Group II-A metal hydroxides, ammonia, ammonium hydroxides and organic amines.
5. The composition of claim 3 where said copolymer latex consists essentially of ethylene and acrylic acid.
6. The composition of claim 5 where said acrylic acid is partially neutralized with an alkaline compound selected from a member of the group consisting of the Group I-A metal hydroxides and the Group II-A metal hydroxides, ammonia, ammonium hydroxides and organic amines.
7. The composition of claim 3 where said copolymer latex consists essentially of ethylene and methacrylic acid.
8. The composition of claim 7 where said methacrylic acid is partially neutralized with an alkaline compound selected from a member of the group consisting of the Group I-A metal hydroxides and the Group II-A metal hydroxides, ammonia, ammonium hydroxides and organic amines.
9. The composition of claim 3 where said copolymer consists essentially of ethylene, acrylic acid, and a 1 to about 12 carbon atoms alkanol esters of acrylic acid.
10. The composition of claim 9 where said acrylic acid is partially neutralized with an alkaline compound selected from a member of the group consisting of the Group I-A metal hydroxides and the Group II-A metal hydroxides, ammonia, ammonium hydroxides and organic amines.
11. The composition of claim 3 where said copolymer latex consists essentially of ethylene, acrylic acid and a 1 to about 12 carbon atom alkanol ester of methacrylic acid.
12. The composition of claim 11 where said acrylic acid is partially neutralized with an alkaline compound selected from a member of the group consisting of the Group I-A metal hydrovides and the Group II-A metal hydroxides, ammonia, ammonium hydroxides and organic amines.
13. The composition of claim 3 where said copolymer latex consists essentially of ethylene, methacrylic acid and a 1 to about 12 carbon atom alkanol ester of acrylic acid.
14. The composition of claim 13 where said methacrylic acid is partially neutralized with an alkaline compound selected from a member of the group consisting of the Group I-A metal hydroxides and the Group II-A metal hydroxides, ammonia, ammonium hydroxides and organic amines.
15. The composition of claim 3 where said copolymer latex consists essentially of ethylene, methacrylic acid and a 1 to about 12 carbon atom alkanol ester of methacrylic acid.
16. The composition of claim 15 where said methacrylic acid is partially neutralized with an alkaline compound selected from a member of the group consisting of the Group I-A metal hydroxides and the Group II-A metal hydroxides, ammonia, ammonium hydroxides and organic amines.
17. An article of manufacture comprising a paper substrate having adhered thereto a coating composition consisting essentially of
 (1) from about 3 to about 30 parts by weight of a binder composed of
  (a) a latex of at least 60% ethylene and from about 3 to about 30% of an alpha-beta olefinically unsaturated organic carboxylic acid, and from 0 to about 37% of a vinylidene compound polymerized therewith, said latex being obtained by polymerizing ethylene monomer, a monomer of an alpha-beta olefinically unsaturated organic carboxylic acid and the monomeric precursor of said vinylidene compound at temperatures from about 100° C. to about 160° C. and pressures from about 5,000 p.s.i.g. to about 50,000 p.s.i.g., said latex being characterized by a particle size of from 0.1 to about 1 micron, a melt index of from greater than 0.1 to about 300, filming temperatures from about 70° C. to about 100° C. and a density from about 0.945 to about 0.975;
  (b) from 0 to about 95 percent, based on said copolymer of a natural adhesive selected from the group consisting of protein adhesives and carbohydrate adhesives;
 (2) 100 parts by weight of a mineral pigment, said copolymer latex being from about 10% to about 70% crystalline.
18. The article of manufacture of claim 17 where said alpha-beta olefinically unsaturated acid is selected from the group consisting of acrylic acid, methacrylic acid, crotonic acid, itaconic acid, citraconic acid, maleic acid, fumaric acid and mixtures thereof.
19. The article of manufacture of claim 18 where said vinylidene compound is selected from a member of the group consisting of 1 to about 12 carbon atom alkanol esters of acrylic, methacrylic, itaconic, citraconic, maleic and fumaric acid, vinyl formate, vinyl acetate, vinyl propionate, vinyl alcohol, vinyl chloride, vinylidene chloride and mixtures thereof.

20. The article of manufacture of claim 19 where said organic acid is partially neutralized with an alkaline compound selected from a member of the group consisting of the Group I–A metal hydroxides and the Group II–A metal hydroxides, ammonia, ammonium hydroxides and organic amines.

21. The article of manufacture of claim 19 where said copolymer latex consists essentially of ethylene and acrylic acid.

22. The article of manufacture of claim 21 where said acrylic acid is partially neutralized with an alkaline compound selected from a member of the group consisting of the Group I–A metal hydroxides and the Group II–A metal hydroxides, ammonia, ammonium hydroxides and organic amines.

23. The article of manufacture of claim 19 where said copolymer latex consists essentially of ethylene and methacrylic acid.

24. The article of manufacture of claim 23 where said methacrylic acid is partially neutralized with an alkaline compound selected from a member of the group consisting of the Group I–A metal hydroxides and the Group II–A metal hydroxides, ammonia, ammonium hydroxides and organic amines.

25. The article of manufacture of claim 19 where said copolymer consists essentially of ethylene, acrylic acid and a 1 to about 12 carbon atom alkanol ester of acrylic acid.

26. The article of manufacture of claim 25 where said acrylic acid is partially neutralized with an alkaline compound selected from a member of the group consisting of the Group I–A metal hydroxides and the Group II–A metal hydroxides, ammonia, ammonium hydroxides and organic amines.

27. The article of manufacture of claim 19 where said copolymer latex consists essentially of ethylene, acrylic acid and a 1 to about 12 carbon atom alkanol ester of methacrylic acid.

28. The article of manufacture of claim 27 where said acrylic acid is partially neutralized with an alkaline compound selected from a member of the group consisting of the Group I–A metal hydroxides and the Group II–A metal hydroxides, ammonia, ammonium hydroxides and organic amines.

29. The article of manufacture of claim 19 where said copolymer latex consists essentially of ethylene, methacrylic acid and a 1 to about 12 carbon atom alkanol ester of acrylic acid.

30. The article of manufacture of claim 29 where said methacrylic acid is partially neutralized with an alkaline compound selected from a member of the group consisting of the Group I–A metal hydroxides and the Group II–A metal hydroxides, ammonia, ammonium hydroxides and organic amines.

31. The article of manufacture of claim 19 where said copolymer latex consists essentially of ethylene, methacrylic acid and a 1 to about 12 carbon atom alkanol ester of methacrylic acid.

32. The article of manufacture of claim 31 where said methacrylic acid is partially neutralized with an alkaline compound selected from a member of the group consisting of the Group I–A metal hydroxides and the Group II–A metal hydroxides, ammonia, ammonium hydroxides and organic amines.

References Cited
UNITED STATES PATENTS

| | | |
|---|---|---|
| 3,265,654 | 8/1966 | Glabisch et al. |
| 3,337,482 | 8/1967 | Watanabe et al. _____ 260—8 |
| 3,347,811 | 10/1967 | Bissot. |
| 3,440,199 | 4/1969 | Lindemann et al. |

WILLIAM H. SHORT, Primary Examiner

E. WOODBERRY, Asistant Examiner

U.S. Cl. X.R.

117—132, 155, 161; 260—6, 9, 17, 29.6, 41, 80.3, 80.6